Nov. 16, 1937.  B. A. CRENSHAW  2,099,331
DIRECTION SIGNAL
Filed Aug. 26, 1935  2 Sheets-Sheet 1

Inventor:
Benjamin A. Crenshaw, Deceased
by Thomas C. Crenshaw, Executor
By C. P. Soper
Atty.

Nov. 16, 1937. B. A. CRENSHAW 2,099,331
DIRECTION SIGNAL
Filed Aug. 26, 1935 2 Sheets-Sheet 2
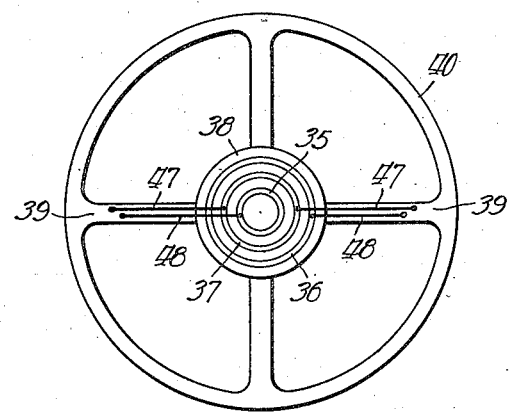
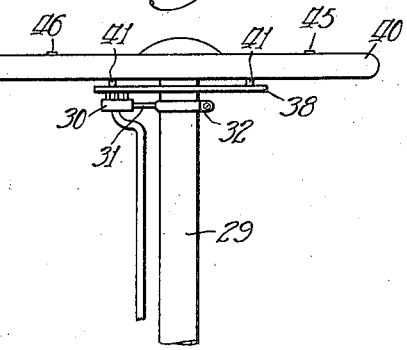
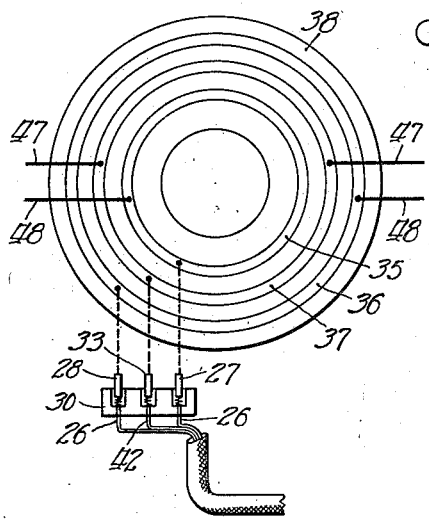
Inventor:
Benjamin A. Crenshaw, Deceased
by Thomas C. Crenshaw, Executor
By: C. P. Sof
Atty.

Patented Nov. 16, 1937

2,099,331

UNITED STATES PATENT OFFICE 2,099,331

DIRECTION SIGNAL

Benjamin A. Crenshaw, deceased, late of Chicago, Ill., by Thomas C. Crenshaw, executor, Chicago, Ill., assignor, by mesne assignments, to Steve Kalisz, Chicago, Ill.

Application August 26, 1935, Serial No. 37,899

1 Claim. (Cl. 177—329)

This invention relates to direction signals such as are adapted for use on automobiles and other vehicles to indicate when the driver of the vehicle intends to turn. The signals are so arranged as to be readily visible from both the front and rear of the vehicle and will prove to be of great utility to drivers of other vehicles or pedestrians.

The present invention is designed as an improvement on the direction signal disclosed in Patent No. 1,836,705 granted December 15, 1931 to B. A. Crenshaw.

The object of the present invention is the provision of a direction signal which may be operated by the driver with the minimum of effort and without materially detracting attention from operation of the vehicle.

One of the features of the invention is the provision of electric switches or buttons, readily accessible to the driver, and electromagnetic means controlled thereby for effecting the actuation of the signaling devices. It is believed these electric switches will preferably be mounted on the steering wheel although they would be practically operative if positioned in any convenient and accessible location.

Another feature of the invention resides in the manner of carrying the electrical circuits from the switch buttons on the steering wheel to the windings of the valve actuating electromagnets.

A still further feature of the invention resides in forming the signal as a hand of glass, preferably red in color, with an incandescent light bulb therein so that the signal may be readily visible from both the front and the rear. If desired, the signals may be of different colors on the opposite sides of the vehicle so as to indicate to an observer the direction the vehicle is traveling.

One of such signaling hands will be provided for each side of the car. These hands will normally be retracted into housings, one at each side of the cowl, and the lights in the hands will normally be deprived of current. When, however, the driver wishes to signal to indicate that he is about to turn, a slight momentary pressure on the appropriate switch button will cause the corresponding signal in the nature of a pointing hand to be projected from its housing and the bulb therein supplied with current.

As in the patent hereinbefore mentioned, the power necessary to project the signal is obtained from the vacuum or suction present in the intake manifold of the engine when it is running.

When the turn has been made and the signal has served its purpose another actuation of the switch causes the signal to be retracted and the light extinguished.

It is believed the further description of the invention will be understood most readily from a detailed description thereof taken in connection with the accompanying drawings, in which Fig. 1 is a schematic layout showing the application of the invention to an automobile;

Fig. 2 is a view of the underside of the steering wheel showing the traveling contacts or commutator thereon;

Fig. 3 is a side view of the steering post and wheel of an automobile showing the commutator attached thereto; and Fig. 4 is a diagrammatic illustration of the contact rings of the commutator carried by the steering wheel and the relation thereto of the stationary contacts or brushes fixed to the steering post or other support.

Figure 1:
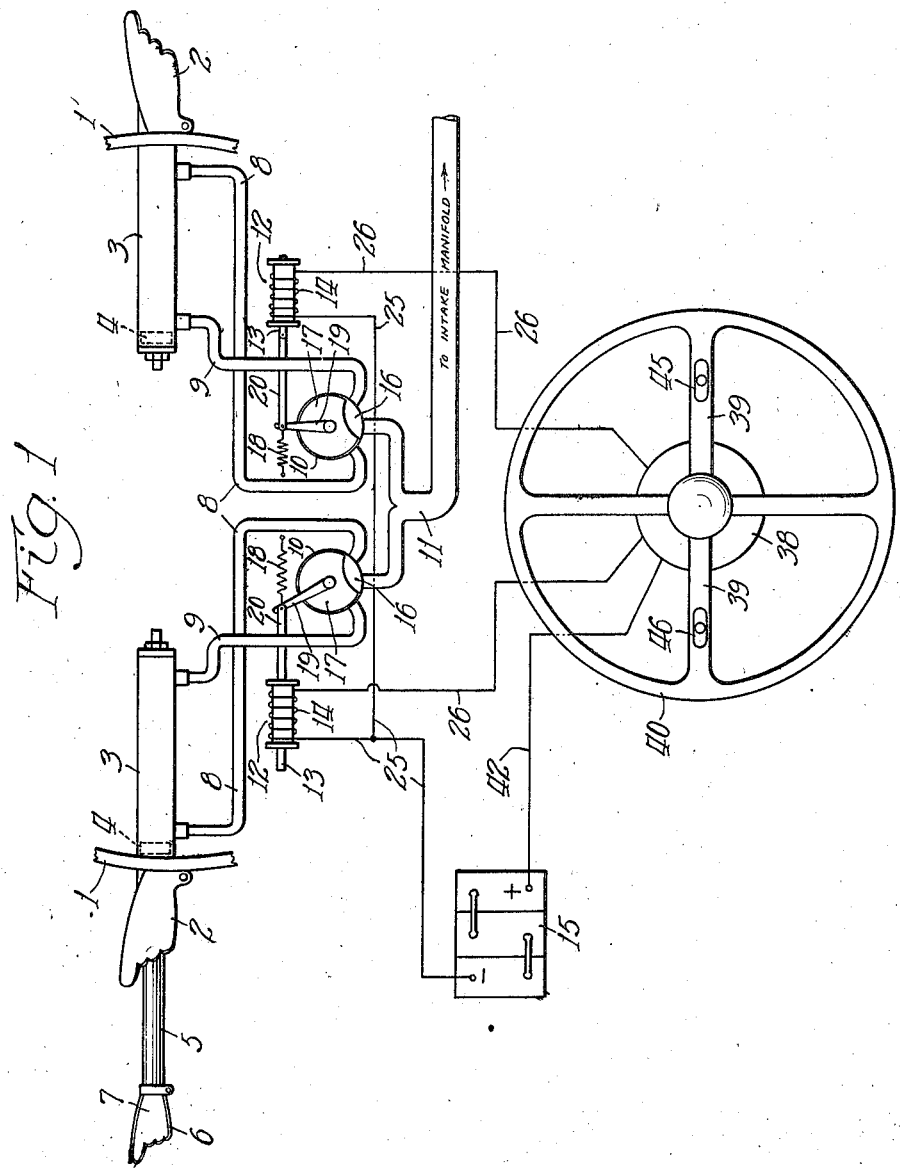

Referring to the drawings, in which like reference characters indicate the same parts in the several views, 1—1 represents portions of the cowl of an automobile at the opposite sides thereof adjacent to the windshield. Mounted on the cowl 1 are the housings 2 which may be of any desired design. If desired the housings 2 may be designed as to project but a slight distance beyond the cowl. Fixed to the inner side of the cowl 1 or adjacent thereto are the cylinders 3. Slidable within the cylinders 3 are pistons 4 to which are secured the inner ends of the rods or plungers 5. To the outer ends of the plungers 4 are secured the signals 6, preferably made of glass in the form of a pointing hand. Within each of the glass hands 6 is an incandescent light bulb 7.

Tubes 8 and 9 connect the opposite ends, respectively, of the cylinders 3 to appropriate valves 10 through the medium of which tubes 8 or 9 may be selectively joined to the pipe 11 which communicates with the intake manifold of the automobile motor.

When one of the valves 10 is so operated as to connect its tube 8 to the pipe 11 the corresponding piston 4 will be drawn to the outer end of its cylinder and the associated signal 6 will be forced outwardly beyond its housing 2 into signaling position, as shown at the left in Fig. 1. When, however, a valve 10 is so operated as to join a tube 9 to pipe 11, the piston will be drawn inwardly and the corresponding signal returned to its housing, as shown at the right in Fig. 1.

It is contemplated that certain electrical conductors and contacts will be provided so that the lamps 7 will be illuminated when the signal is extended and effaced when the signal is returned to its housing. This, however, is shown in the patent above noted and forms no part of the present invention.

The part of the invention thus far described in detail, except as to the glass hand and the electromagnetically operated valve, may be similar to that disclosed in the said patent to which reference may be made for a fuller disclosure of a complete structure.

The present invention contemplates means whereby the valves 10 may be operated electromagnetically under the control of electrical switches in the form of buttons or keys positioned on the steering wheel or other readily accessible location. Thus, by the present invention, a mere touch by the driver of a button or key will cause the appropriate signal hand to be projected and illuminated, clearly indicating to observers in both directions that a turn is about to be made and also the direction of the turn. After the turn has been made, another touch of the button causes the signal to return to non-indicating position and the light effaced.

For the purpose of operating the valves 10 solenoids 12 are provided, each solenoid having an armature or core 13 adapted to be drawn therein when current is caused to flow through the coil 14 of the solenoid from the storage battery 15.

Each valve 10 has a central recess 16 with which the tubes 8, 9 and 11 communicate. When the movable valve member 17 is rotated by the energization of a solenoid winding 14 it occupies a position such that tube 9 is blocked and tube 8 communicates with tube 11 thus causing the piston 4 to move outwardly to display the signal, as to the left in Fig. 1. When the flow of current through a winding 14 is interrupted the attraction of the core 13 terminates and an appropriate spring 18 acts to withdraw the core 13 from its solenoid 12 thus moving the valve member 17 to a position so that it causes tube 8 to be blocked and tube 9 joined to tube 11. The parts will now assume the positions shown at the right in Fig. 1.

It will be understood that each movable valve member 18 is provided with an operating arm 19 the outer end of which is joined to the outer end of the core or armature 13 through the medium of link 20. The retractile spring 18 also has one end secured to the end of arm 19.

The glass hands will be formed of colored glass preferably red, at least as to the one at one side of the vehicle. If desired the two signal hands at the opposite sides of the vehicle may be formed of glass of contrasting colors so that the direction in which the vehicle is progressing and the direction of the turn about to be made can readily be told by an observer either in front of or behind the car.

I will now describe the circuits and switches by means of which the solenoids 12 are energized to actuate the valve members 17. Each of the solenoid windings 14 has one end joined by conductor 25 to the negative pole of storage battery 15. The other ends of coils 14 are joined by conductors 26 to appropriate wipers or brushes 27 and 28, respectively, carried by the block 30 fixed to the steering post 29 by means of the arm 31 and clamping ring 32. Block 30 carries a third wiper 33. From an inspection of Figs. 3 and 4 it will be noted that the brushes 27, 28 and 33 are in wiping contact with the commutator rings 35, 36 and 37, respectively, which are mounted on the annular member 38 secured to the spokes 39 of the steering wheel 40 by means of studs 41. The middle commutator ring 37 is connected to the live pole of battery 15 by means of conductor 42.

Mounted on or in opposite spokes 39 of the steering wheel 40 are electric switches 45 and 46, respectively. These switches may be of any desired kind. As switches of this character are exceedingly old and well known it has not been thought to be advisable to burden this application with a detailed description thereof.

The function of these switches 45 and 46 is to provide readily accessible means for electrically joining at will either conductor 47 to its companion conductor 48.

I will say for illustration that key or switch 45 is thrown to operative position. A circuit will now extend from battery 15 over conductor 25 through coil 14 at the right in Fig. 1, conductor 26, wiper 28, commutator ring 36, wire 48, switch 45, wire 47, commutator ring 37, wiper 33, and conductor 42 back to battery. This will cause the energization of coil 14 at the right and the display of the right signal in a manner which will now be well understood.

In like manner, if the switch 46 is actuated a circuit will be formed from battery 15 through conductor 25, coil 14, at the left, wire 26, brush or wiper 27, ring 35, conductor 48, switch 46, conductor 47, ring 36, brush 33 and conductor 42 back to battery, thus causing the left signal to be displayed.

When one of the switches 45 or 46, after being actuated, is returned to its normal or inoperative position the corresponding coil 14 becomes deenergized and spring 18 acts to move the valve into a position to cause the signal to be retracted.

While in the preferred embodiment of applicant's invention the controlling switches will preferably be mounted on the steering wheel, it is to be understood that said switches may readily be mounted in other positions which will permit of their ready operation. It is also to be understood that many modifications of the details of the device herein disclosed are contemplated. The invention, therefore, should be limited only by the scope of the appended claim.

Having described the invention, what is claimed as new and desired to be secured by United States Letters Patent is:

The combination with the pneumatic-pressure causing means of an automobile, of a signal, a piston to project it, a cylinder for the piston, two pipes, one extending from each end of said cylinder, a valve whose throw in one direction connects one pipe to the area subject to pneumatic pressure and excludes the other and whose throw in the opposite direction connects the latter pipe and excludes the former, and the combination with the electricity producing means of the automobile, of an electric circuit having an opening and closing switch and a spring-opposed electromagnet combined with the combination, first stated above and characterizing it by the fact that it controls the valve of said combination so that when the said circuit is closed the electromagnet operates the valve to project the signal by pneumatic pressure and when the circuit is opened the spring reverses the position of the valve and causes pneumatic-pressure to retract the signal.

THOMAS C. CRENSHAW,
*Executor of the Last Will and Testament of Benjamin A. Crenshaw, Deceased.*